United States Patent
Östergård et al.

(10) Patent No.: US 7,176,894 B2
(45) Date of Patent: *Feb. 13, 2007

(54) DOUBLE-SIDED KEYBOARD FOR USE IN AN ELECTRONIC DEVICE

(75) Inventors: Toni Östergård, Turku (FI); Seppo Salminen, Turku (FI); Jaakko Nousiainen, Marttila (FI)

(73) Assignee: Nokia Corporation, Espoo (FI)

( * ) Notice: Subject to any disclaimer, the term of this patent is extended or adjusted under 35 U.S.C. 154(b) by 583 days.

This patent is subject to a terminal disclaimer.

(21) Appl. No.: 10/634,471

(22) Filed: Aug. 4, 2003

(65) Prior Publication Data

US 2004/0061685 A1 Apr. 1, 2004

Related U.S. Application Data

(60) Division of application No. 10/053,531, filed on Jan. 18, 2002, now Pat. No. 6,760,015, which is a continuation-in-part of application No. 09/702,539, filed on Oct. 31, 2000, now Pat. No. 6,630,925.

(51) Int. Cl.
*G09G 5/00* (2006.01)
(52) U.S. Cl. ..................... 345/168; 345/169
(58) Field of Classification Search .............. 345/168, 345/169, 170, 171, 172
See application file for complete search history.

(56) References Cited

U.S. PATENT DOCUMENTS

| | | | | |
|---|---|---|---|---|
| 3,940,758 | A | | 2/1976 | Margolin .................. 340/337 |
| 5,189,632 | A | * | 2/1993 | Paajanen et al. ........... 708/109 |
| 5,715,524 | A | | 2/1998 | Jambhekar et al. ........... 455/90 |
| 5,742,894 | A | | 4/1998 | Jambhekar et al. ........... 455/90 |
| 5,898,758 | A | | 4/1999 | Rosenberg .................. 379/57 |
| 6,038,313 | A | | 3/2000 | Collins ..................... 379/433 |
| 6,046,730 | A | * | 4/2000 | Bowen et al. .............. 345/168 |
| 6,115,616 | A | | 9/2000 | Halperin et al. ............ 455/557 |
| 6,180,895 | B1 | | 1/2001 | Hutchinson et al. ........... 200/5 |
| D448,032 | S | | 9/2001 | Talley ...................... D14/396 |
| 6,550,927 | B1 | | 4/2003 | Messel ...................... 362/24 |

* cited by examiner

*Primary Examiner*—Richard Hjerpe
*Assistant Examiner*—Jean Lesperance
(74) *Attorney, Agent, or Firm*—Ware, Fressola, Van Der Sluys & Adolphson LLP

(57) ABSTRACT

A keyboard having a plurality of first keys on one side and second keys on the other, separated by a circuit board and a plurality of domes. The circuit board can be activated for entering information in an electronic device by pressing one or more keys on either side via the domes. The keyboard can be fixedly mounted on the cover of the electronic device such that the first keys can be used when the cover is closed and the second keys can be used when the cover is open. The keyboard can also be removably mounted so as to allow a user to change the keyboard side to be used. Alternatively, one side of the keyboard has a touch pad instead of keys.

23 Claims, 13 Drawing Sheets

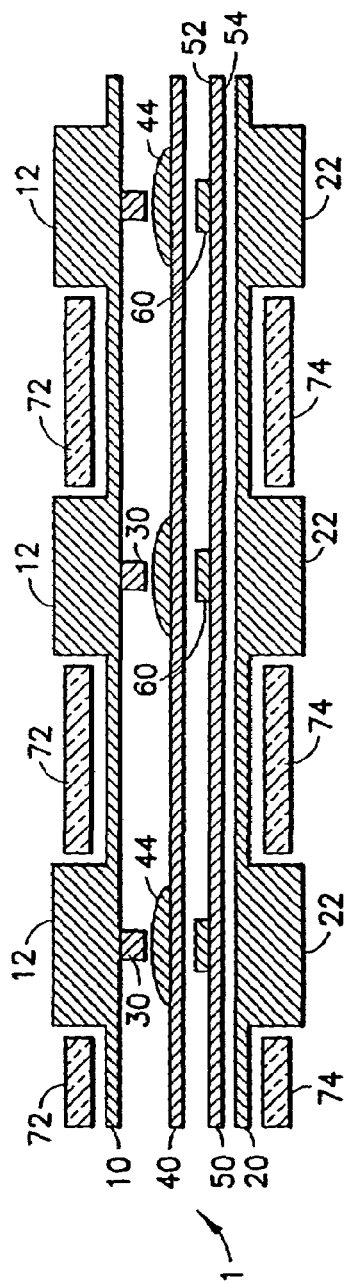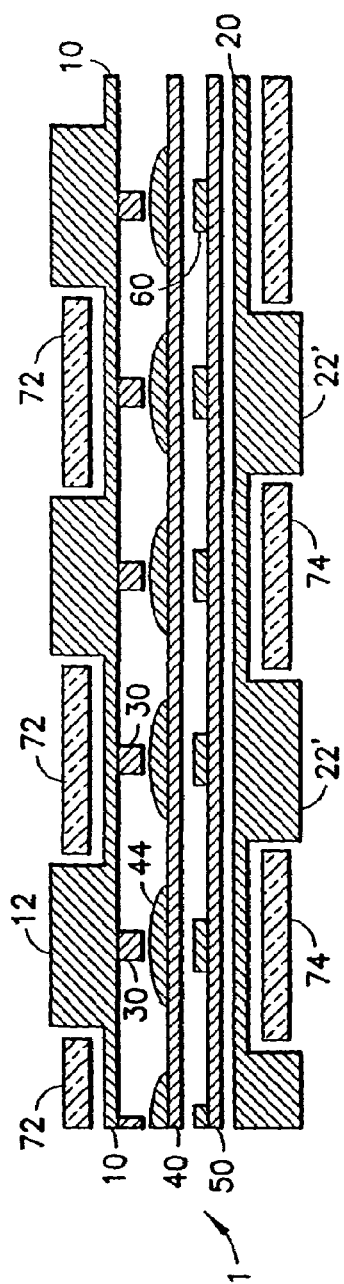
FIG.3a
FIG.3b

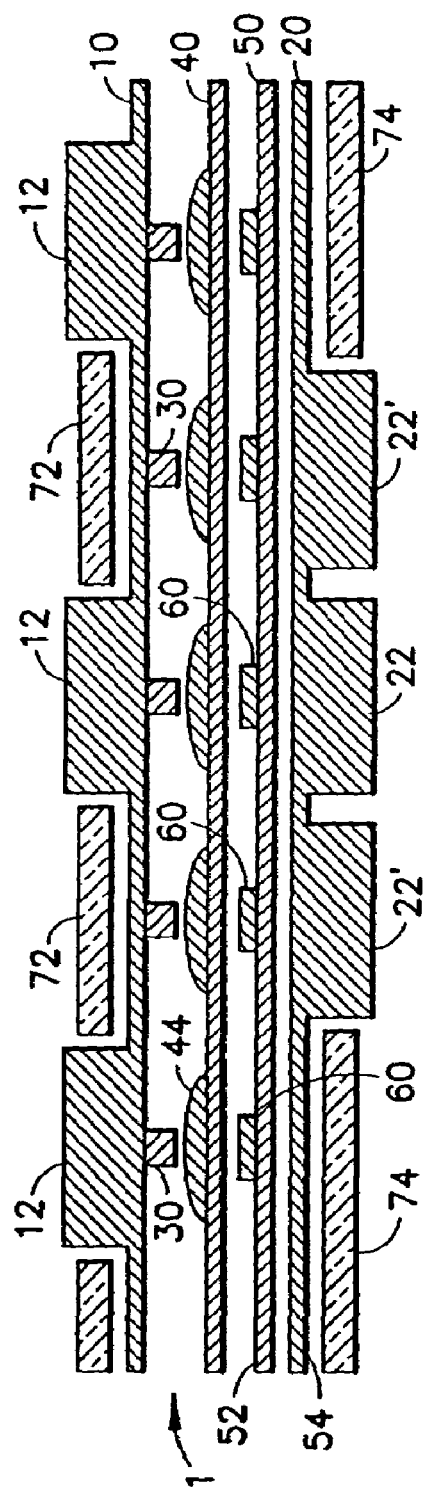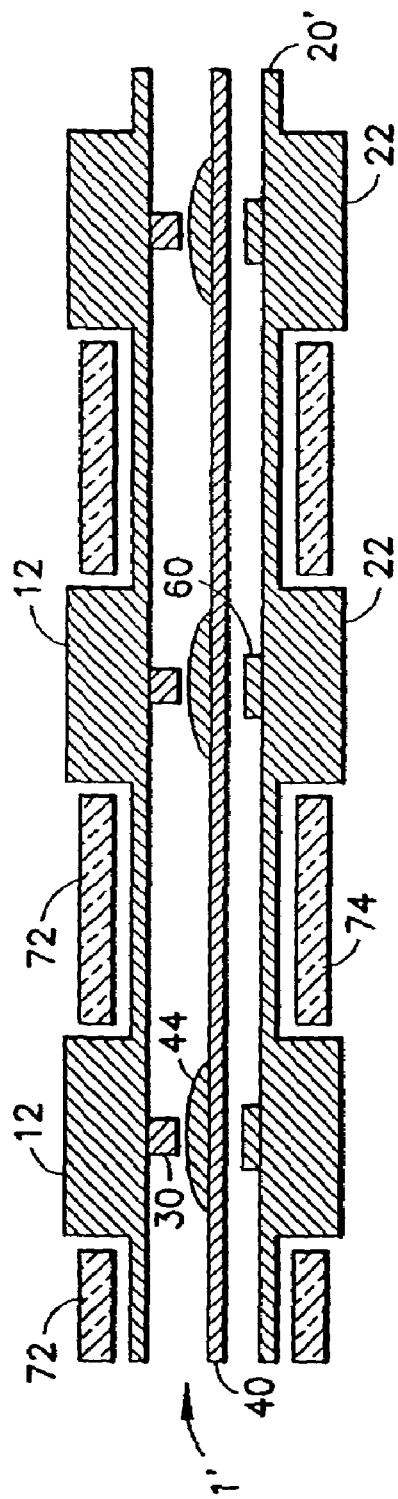
FIG.3c
FIG.3d

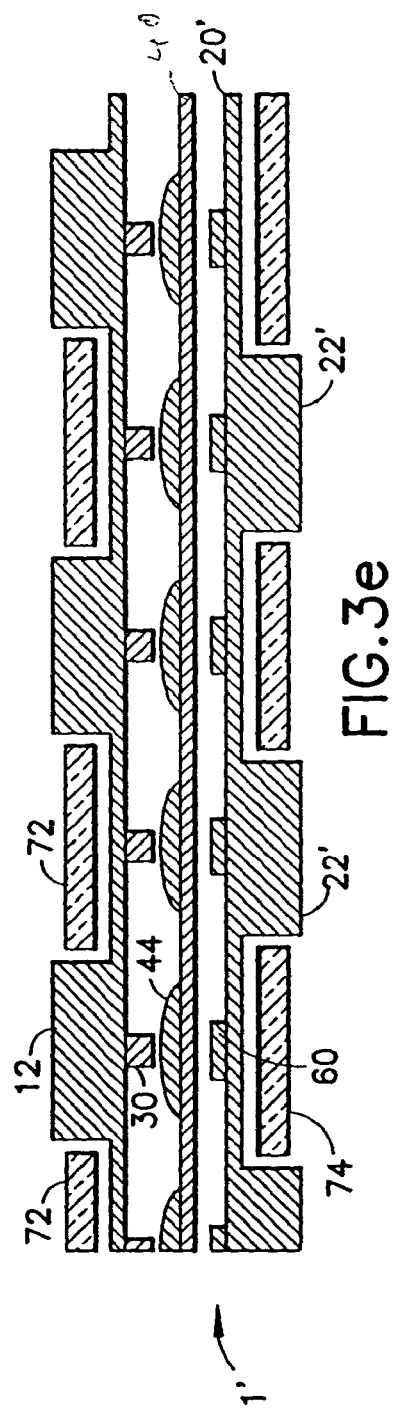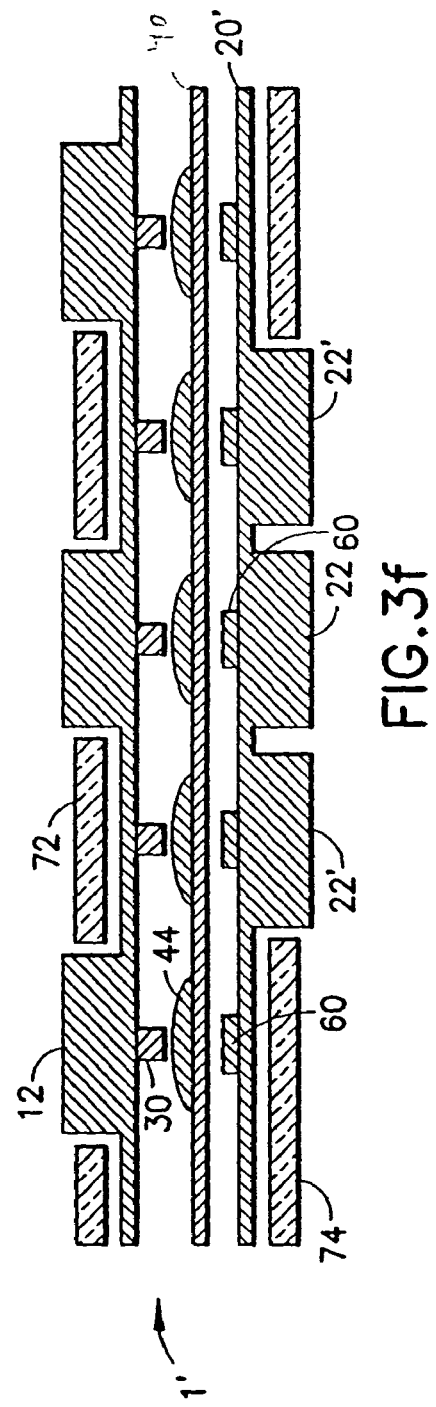

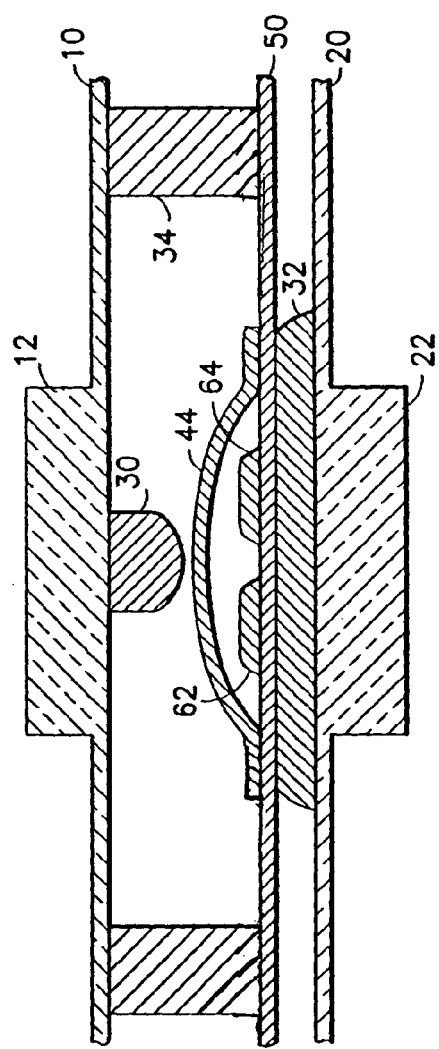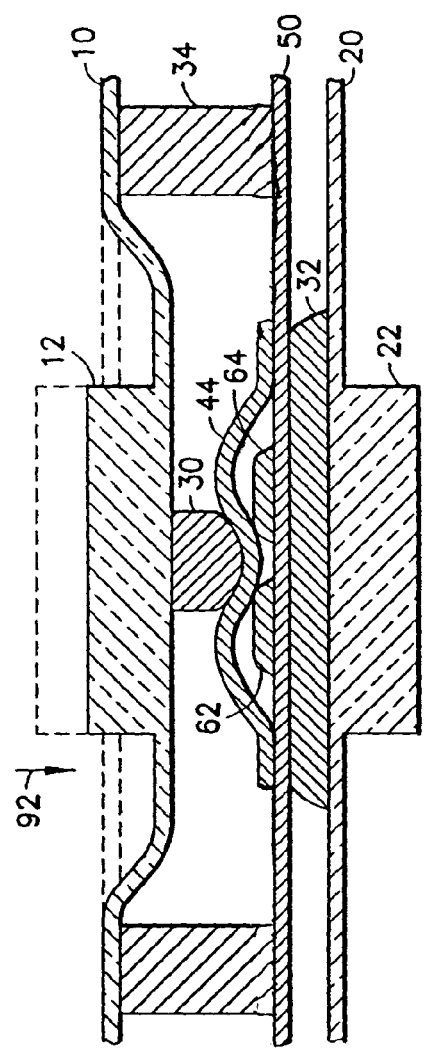

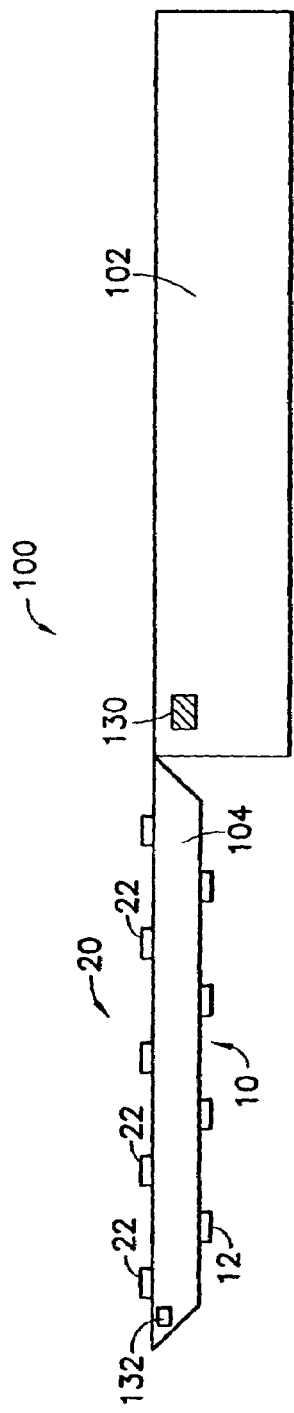
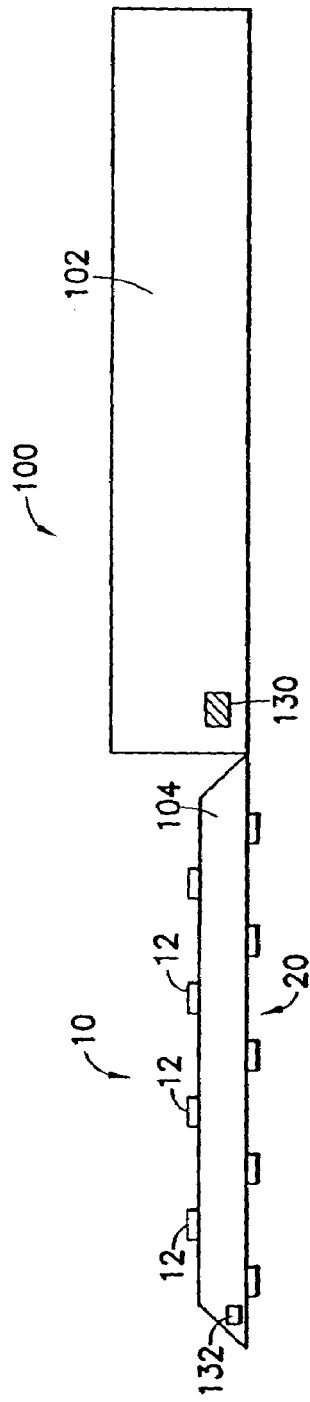

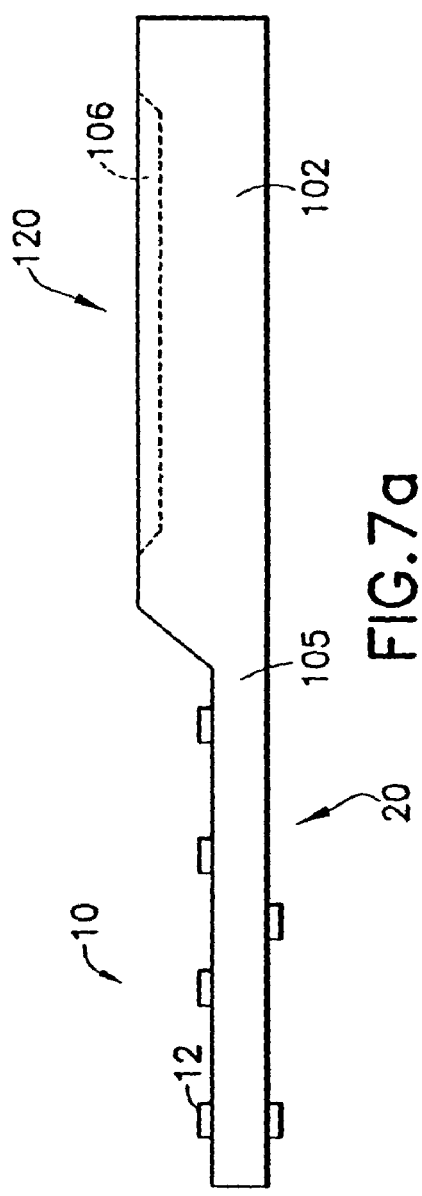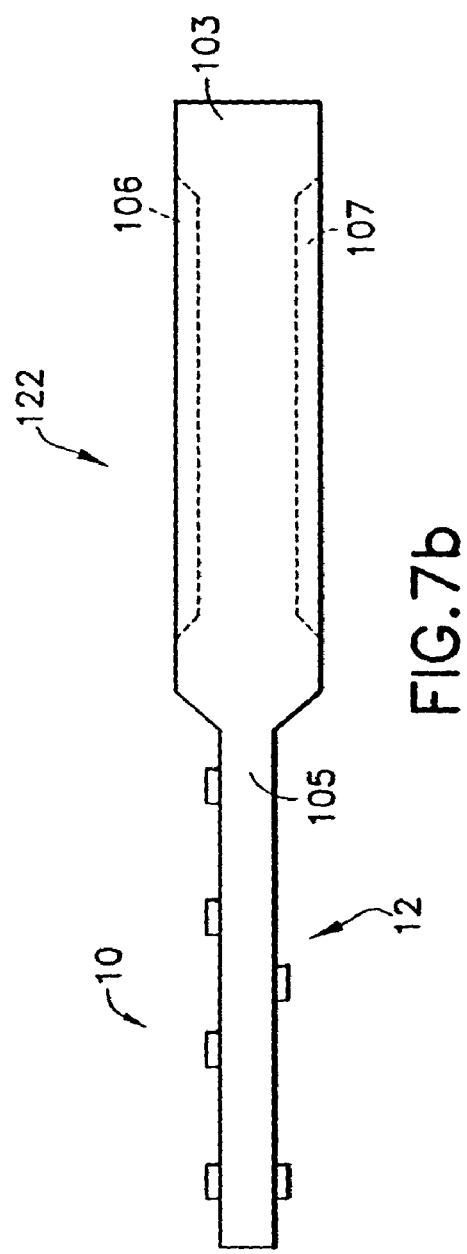

DOUBLE-SIDED KEYBOARD FOR USE IN AN ELECTRONIC DEVICE

This application is a divisional of application(s) application Ser. No. 10/053,531 filed on Jan. 18, 2002 now U.S. Pat. No. 6,760,015.

This is a Continuation-In-Part application of U.S. parent application Ser. No. 09/702,539, entitled "Double-sided Keyboard Having Two Keymats and One Activation Mat", filed Oct. 31, 2000 now U.S. Pat. No. 6,630,925 and assigned to the assignee of the present invention.

FIELD OF THE INVENTION

The present invention relates generally to a keyboard in an electronic device and, more particularly, to a double-sided keyboard having two keymats, or two sets of individual keys, located on both sides of the keyboard for entering information into an electronic device.

BACKGROUND OF THE INVENTION

Man-machine interaction, in terms of user input, is of utmost importance in portable communication devices. Splitting up one single keyboard into two or more sub-keyboards is one of the ways to improve the efficient use of a communication device. For example, in a Communicator, a phone keyboard can be used when the Communicator functions as a telephone, and another separate QWERTY keyboard can be used when the Communicator is used for other functions. As portable communication devices become smaller and more compact, the available space and volume for two or more sub-keyboards becomes more limited.

It is desirable to provide a cost-effective method and apparatus for entering information in an electronic device depending on the functions of the device.

SUMMARY OF THE INVENTION

According to the first aspect of the present invention, there is provided a double-sided keyboard for entering information in an electronic device. The keyboard comprises:

a circuit board having a first side and an opposing second side;

a first plurality of keys adjacent to the first side;

a second plurality of keys adjacent to the second side; and a plurality of electrically conductive members disposed on the first side of the circuit board so that when at least one of the keys is pressed, at least one electrically conductive member is operatively connected to the circuit board for providing a signal indicative of the information for use in the electronic device.

Preferably, the electrically conductive members comprise a plurality of dome-shaped segments for making electrical contact with the circuit board to activate the circuit board for providing the signals.

Possibly, the dome-shaped segments are shared with the first and second plurality of keys such that each dome-shaped segment can be caused to make electrical contact with the circuit board by either one of the first plurality of keys or one of the second plurality of keys.

Alternatively, the electrically conductive members comprise a first plurality of dome-shaped segments for making electrical contact with the circuit board to activate the circuit board by pressing one of the first plurality of keys; and a second plurality of dome-shaped segments for making electrical contact with the circuit board to activate the circuit board by pressing one of the second plurality of keys.

Preferably, the first plurality of keys are capable of activating the circuit board only when the keyboard is oriented in a first direction, and the second plurality of keys are capable of activating the circuit board only when the keyboard is oriented in a second direction different from the first direction.

Preferably, the first plurality of keys are positioned above the circuit board when the keyboard is oriented in the first direction, and the second plurality of keys are positioned above the circuit board when the keyboard is oriented in the second direction.

Possibly, the electronic device comprises a device body having a device connector and the circuit board comprises a circuit connector for electrically connecting to the device connector for conveying the signal from the keyboard to the device body.

Possibly, the circuit connector is removable from the device connector so as to allow the keyboard to be detached from the device body.

According to the present invention, the electrically conductive members are fixedly attached to the circuit board, or they are disposed on a mat disposed between the first plurality of keys and the circuit board.

According to the present invention, the first plurality of keys are individually disposed or they are part of a keymat. Likewise, the second plurality of keys are individually disposed or they are part of a further keymat.

Preferably, the electrically conductive members comprise a plurality of dome-shaped segments for making electrical contact with the circuit board to activate the circuit board for providing the signal.

According to the second aspect of the present invention, there is provided an electronic device including a device body having a body direction facing a user to allow the user to enter information in the electronic device, the electronic device comprising:

a device connector disposed on the device body; and a double-sided keyboard for entering the information, the keyboard having a first side and an opposing second side, the keyboard comprising:

a circuit connector;

a circuit electrically connected to the circuit connector;

a first user interface having a plurality of keys disposed on the first side of the keyboard;

a plurality of dome-shaped segments disposed between the keys and the circuit, wherein when at least one of the keys is pressed, at least one of the dome-shaped segments is deformed, causing the first user interface to interact with the circuit for providing signals indicative of the information;

a second user interface disposed on the second side of the keyboard and capable of interacting with the circuit for providing the signals, wherein the circuit connector is electrically connected to the device connector for conveying the signals from the keyboard to the device body when the keyboard is attached to the device body, and the keyboard can be attached to the device body either in a first position such that the first side is oriented in a direction substantially the same as the device direction so as to allow the user to enter the information via the first user interface, or in a second position such that the second side is oriented in a direction substantially the same as the device orientation so as to allow the user to enter the information via the second user interface.

Preferably, the second user interface comprises a plurality of further keys, and wherein the further keys cause the circuit to make contact with the dome-shaped segments for providing the signals when at least one of the further keys is pressed, and the dome-shaped segments are electrically conductive for causing the circuit to provide the signals when the deformed dome-shaped segment electrically contacts the circuit.

Alternatively, the second user interface comprises a touch surface which causes the circuit to provide the signals when pressure is asserted at a location of the touch surface.

Possibly, the dome-shaped segments are electrically non-conductive, and when at least one of the keys is pressed, the pressed key asserts the pressure to the touch surface through the deformed dome-shaped segment.

According to the third aspect of the present invention, there is provided a double-sided keyboard removably attached to an electronic device to allow a user to enter information in the electronic device, the keyboard comprising:

a first side and an opposing second side;

a circuit connector;

a circuit electrically connected to the circuit connector;

a first user interface having a plurality of keys disposed on the first side of the keyboard;

a plurality of dome-shaped segments disposed between the keys and the circuit, wherein when at least one of the keys is pressed, at least one of the dome-shaped segments is deformed, causing the first user interface to interact with the circuit for providing signals indicative of the information;

a second user interface different from the first user interface, disposed on the second side of the keyboard, and capable of interacting with the circuit for providing the signals, wherein the circuit connector is electrically connected to the device connector for conveying the signals from the keyboard to the device body when the keyboard is attached to the device body.

Preferably, the second user interface comprises a plurality of further keys, and wherein the further keys cause the circuit to make contact with the dome-shaped segments for providing the signals when at least one of the further keys is pressed. The dome-shaped segments are electrically conductive for causing the circuit to provide the signals when the deformed dome-shaped segment electrically contacts the circuit.

Alternatively, the second user interface comprises a touch surface, which causes the circuit to provide the signals when pressure is asserted at a location of the touch surface.

Possibly, the dome-shaped segments are electrically non-conductive. When at least one of the keys is pressed, the pressed key asserts the pressure to the touch surface through the deformed dome-shaped segment.

The present invention will become apparent upon reading the description taken in conjunction with FIGS. 1a to 10c.

BRIEF DESCRIPTION OF THE DRAWINGS

FIG. 3a is a cross sectional view illustrating the double-sided keyboard of the present invention, wherein the keys on both sides of the keyboard share the same activation devices in order to activate the circuit board.

FIG. 3b is a cross-sectional view illustrating the double-sided keyboard, wherein the keys on the two sides of the keyboard use different activation devices to active the circuit board.

FIG. 3c is a cross-sectional view illustrating the double-sided keyboard, wherein some keys on both sides of the keyboard use the same activation devices but some keys use different activation devices to activate the circuit board.

FIG. 3d is a cross-sectional view illustrating the double-sided keyboard of the present invention, wherein the keys on both sides of the keyboard share the same activation devices in order to activate a connection area integrated into a keymat.

FIG. 3e is a cross-sectional view illustrating the double-sided keyboard, wherein the keys on both sides of the keyboard use different activation devices to activate a connection area integrated into a keymat.

FIG. 3f is a cross-sectional view illustrating the double-sided keyboard, wherein some keys on both sides of the keyboard use the same activation devices but some keys use different activation devices to activate a connection area integrated into a keymat.

FIG. 4a is a cross-sectional view illustrating two keys, which share a common activation device.

FIG. 4b is a cross-sectional view illustrating the activation of the circuit board by pressing the key on one side of the keyboard, wherein the keys on both sides share the same activation devices.

FIG. 6b is a diagrammatic representation of the same electronic device, as illustrated in FIG. 6a, wherein the switching mechanism defines another keyboard mode when the cover is open.

FIG. 6c is a diagrammatic representation of the same electronic device, as illustrated in FIG. 6a, wherein a directional switch is used to further define the keyboard modes.

FIG. 7a is a diagrammatic representation of an electronic device having a keyboard as an extended portion of the electronic device.

FIG. 7b is a diagrammatic representation of another electronic device having a keyboard as an extended portion of the electronic device.

DETAILED DESCRIPTION OF THE INVENTION

Figure 1B:
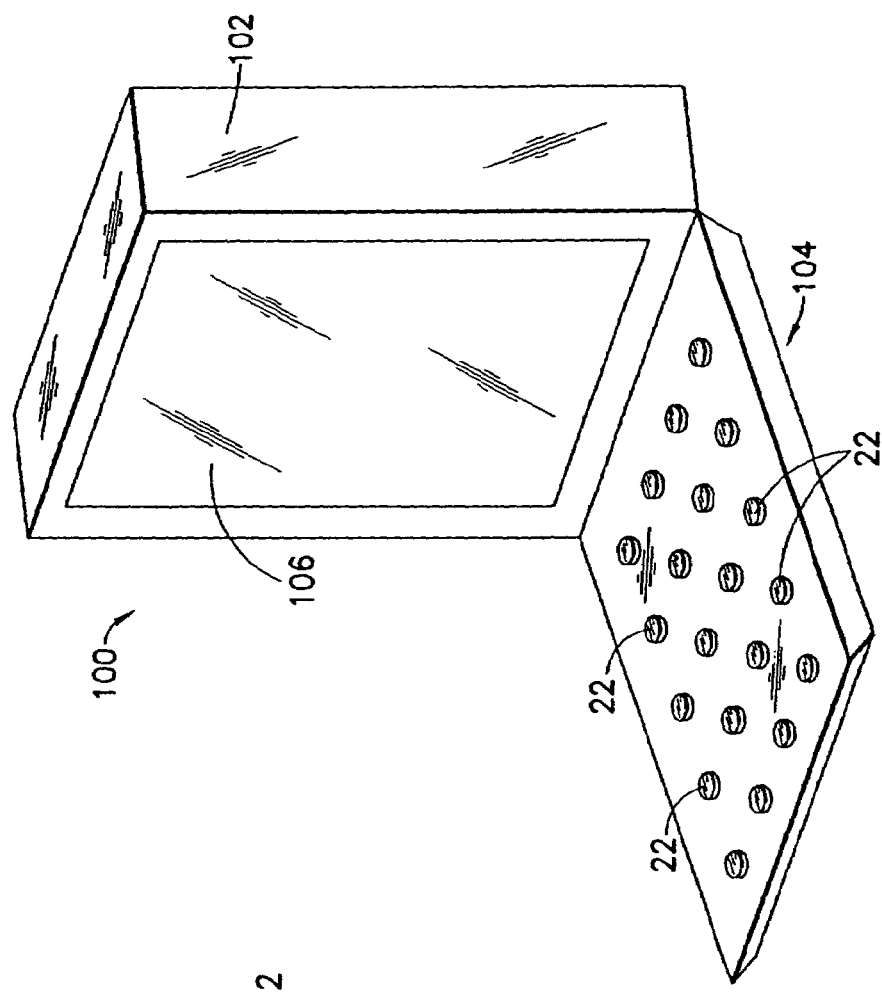
FIG. 1b is a diagrammatic representation illustrating the same electronic device with the cover being opened to expose another set of keys.
Figure 1A:
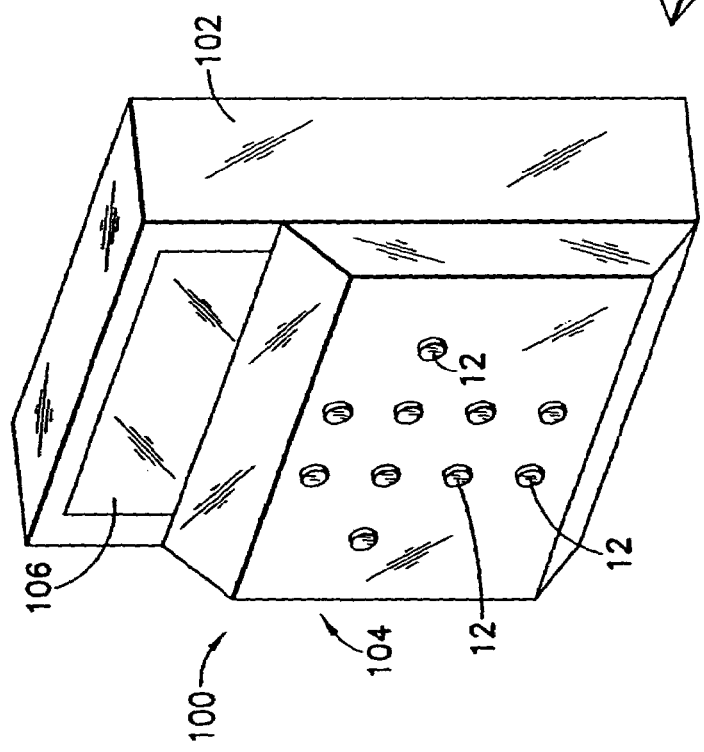
FIG. 1a is a diagrammatic representation illustrating a portable electronic device having a set of keys on its cover.

FIGS. 1a and 1b illustrate a portable electronic device 100, such as a personal digital assistant, which has a device body 102 and a cover 104. When the cover 104 is in a closed position, it exposes a set of first keys 12, as shown in FIG. 1a. When the cover 104 is in an open position, it exposes a different set of second keys 22, as shown in FIG. 1b. The device body 102 has a display 106 to show information to the user. It is understood that the cover 104 is electrically connected to the device body 102 for allowing the keys 12 and 22 to provide signals to the device body 102 for use in the device 100.

Figure 2B:
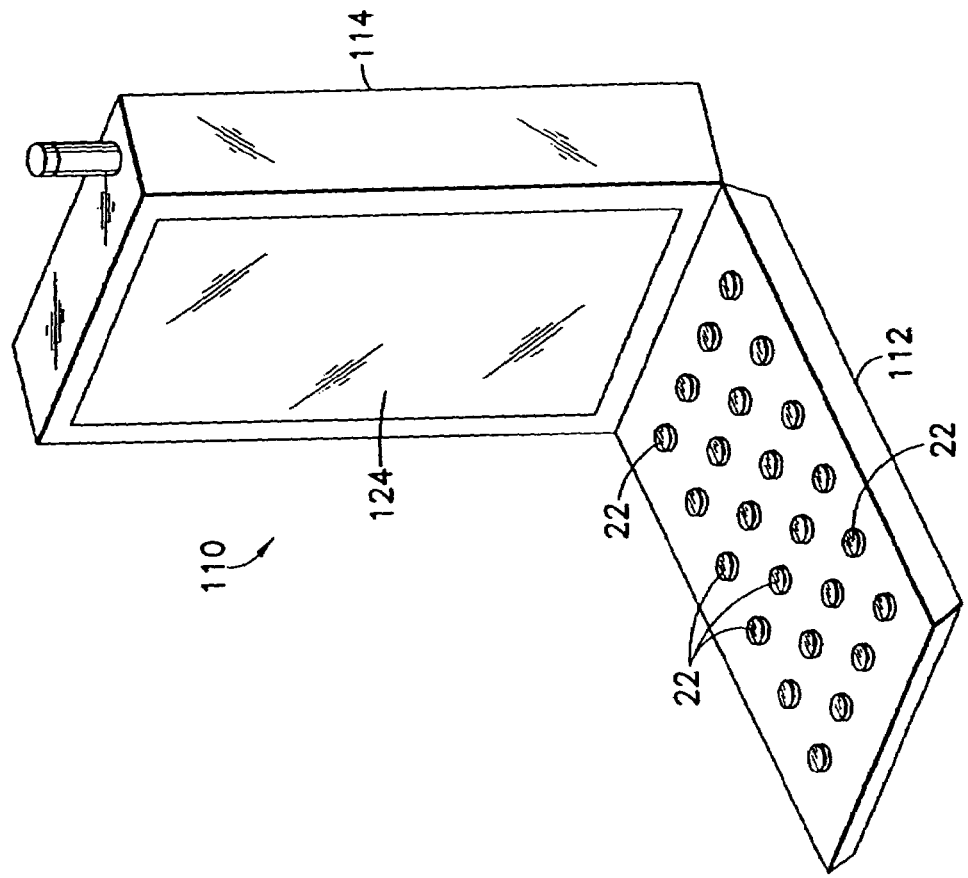
FIG. 2b is a diagrammatic representation illustrating the same communication device with the cover being opened to expose another set of keys.
Figure 2A:
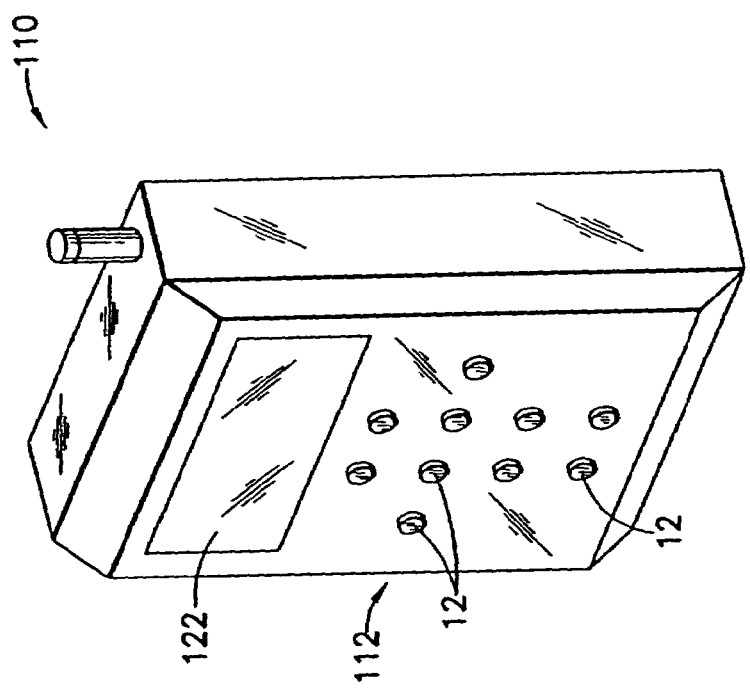
FIG. 2a is a diagrammatic representation illustrating a communication device having a set of keys on its cover.

FIGS. 2a and 2b illustrate a communication device 110, such as a communicator device, which includes a phone keyboard having a plurality of first keys 12, and a larger keyboard, such as a QWERTY keyboard, having a plurality of second keys 22. The communication device 110 has a display 122 to be used as a phone display when the cover 112 is in a closed position, as shown in FIG. 2a. The communication device 110 also has another display 124 on the device body 114 to be used when the cover 112 is an open position, as shown in FIG. 2b. It is understood that the cover 112 is electrically connected to the device body 114 for allowing the keys 12 and 22 to provide signals to the device body 114 for use in the device 110.

As shown in FIGS. 1a to 2b, the first keys 12 and the second keys 22 are located on different sides of the cover 112. Preferably, the key functions of the first keys 12 are different from the key functions of the second keys 22. For example, the first keys 12 include number keys 0 to 9, a star key (*), and a pound sign (#), and the second keys 22 include alphabetic keys. However, it is also possible that some or all of the first keys 12 have the same key functions as those of the corresponding second keys 22.

FIGS. 3a–3c are cross-sectional views of the double-sided keyboard 1 of the present invention. The double-sided keyboard 1 can be used on the cover 104 of the electronic device 100, as shown in FIGS. 1a and 1b, or the cover 112 of the communication device 110, as shown in FIGS. 2a and 2b. As shown in FIGS. 3a–3c, the double-sided keyboard 1 includes a circuit board 50 having a first side 52 and an opposing second side 54. Preferably, the circuit board 50 is a flexible printed circuit board (PCB), printed wire board (PWB), or a flexible connector arrangement, having electrical connection pads 60 for reading the key input on the first side 52. Flexible connector arrangements and electrical connection pads 60 are well known in the art and are not part of the present invention. On the first side 52 of the circuit board 50, a plurality of dome-shaped, electrically conductive pads 44, is provided to make electrical contact with the electrical connection pads 60 on the circuit board 50 so as to produce electrical signals. The dome-shaped, electrically conductive pads 44 can be individually and directly disposed on the circuit board 50, as shown in FIGS. 4a–4d. The individual pads 44 can be attached to the circuit board 50 with glues, tapes or by soldering, welding, or any other known attachment techniques. Alternatively, the electrically conductive pads 44 are produced on a dome-sheet or activation mat 40, as shown in FIGS. 3a–3f. The first keys 12 and second keys 22 can be individually keys, which are not physically linked to each other. However, the first keys 12 can be physically linked to each other by a first keymat 10, which is placed on top of the activation mat 40, as shown in FIGS. 3a–3c. Likewise, the second keys can be physically linked to each other by a second keymat 20, which is placed below the activation mat 40, as shown in FIGS. 3a–3c. An actuator 30 is provided under each first key 12 so that when the first key 12 is pressed towards the circuit board 50, the corresponding dome-shaped, electrically conductive contact pad 44 is depressed by the actuator 30, causing the contact pad 44 to make electrical contact with is the corresponding electrical connection pad 60 (See FIG. 4b, where the electrical connection pad is represented by terminals 62, 64). Optionally, a mat cover 72 is provided over the first keymat 10 to physically isolate one first key 12 from another. Likewise, when a second key 22 is pressed towards the circuit board 50, the dome-shaped, electrically conductive contact pad 44 is depressed by a corresponding actuator 30, causing the contact pad 44 to make electrical contact with the corresponding electrical connection pad 60 (See FIG. 4c, where the electrical connection pad is represented by terminals 62, 64). Moreover, a mat cover 74 is provided over the second keymat 20 to physically isolate one second key 22 from another. Preferably, one or both of the mat covers 72 and 74 can also serve as a mechanical support to the whole keyboard arrangement, especially if individualy keys 12, 22 are used instead of the keymats 10 and 20.

FIG. 3a shows a double-side keyboard 1, wherein the first keys 12 share the same dome-shaped, electrically conductive contact pads 44 with the corresponding second keys 22. FIG. 3b shows a double-sided keyboard 1, wherein the first keys 12 use different dome-shaped, electrically conductive contact pads 44 from the second keys 22. FIG. 3c shows a double-sided keyboard 1, wherein some of the second keys 22 of the second keymat 20 share the same conductive pads 44 with the first keys 12 of the first keymat 10, and some of the second keys 22 use separate conductive pads 44.

FIGS. 3d–3f are cross-sectional views of the double-sided keyboard 1' of the present invention. The double-sided keyboard 1' can be used on the cover 104 of the electronic device 100, as shown in FIGS. 1a and 1b, or the cover 112 of the communication device 110, as shown in FIGS. 2a and 2b. The double-sided keyboard 1' is essentially the same as the double-sided keyboard 1, as shown in FIGS. 3a–3c, except that the electrical connection pad 60 (See FIG. 4c, where the electrical connection pad is represented by terminals 62, 64) and the necessary connection circuitry are integrated to the second keymat 20'. Thus, the second keymat 20' also functions as a keyboard similar to the circuit board 50 as shown in FIGS. 3a–3c.

Figure 4C:
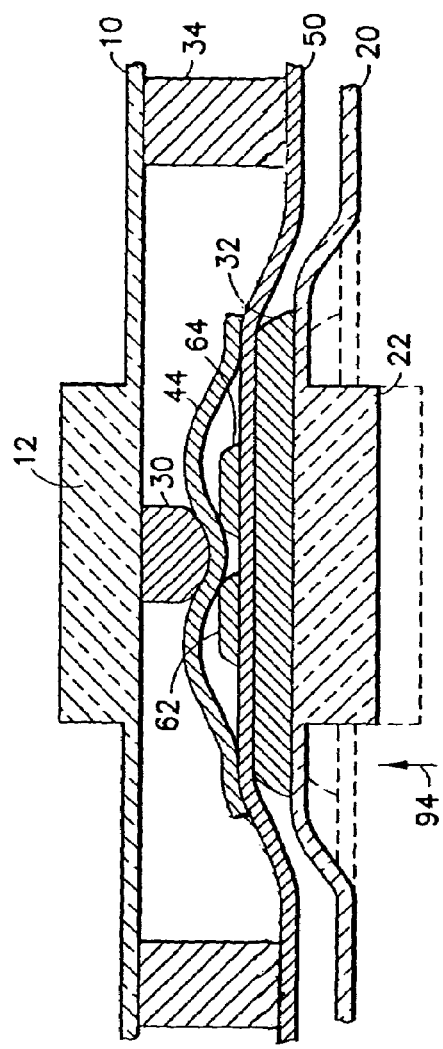
FIG. 4c is a cross-sectional view illustrating the activation of the circuit board by pressing the key on the other side of the keyboard, wherein the keys on both sides share the same activation devices.

FIGS. 4a to 4c are cross-sectional views illustrating the activation of the circuit board by pressing a first key 12 or a second key 22, wherein the keys on both sides of the keyboard share the same activation devices. For illustrative purposes, the connection pad 60 on the circuit board 50 is represented by two conductive terminals 62, 64 provided under each dome-shaped, electrically conductive contact pad 44. It is preferred that a base support 32 is provided between the second key 22 and the circuit board 50 in the area around the terminals 62, 64. When the contact pad 44 is remote from the terminals 62, 64, as shown in FIG. 4a, the terminals 62, 64 act like an open switch. When the first key 12 is pressed towards the circuit board 50 along a direction denoted by an arrow 92 from its original position shown in phantom, the actuator 30 depresses the dome-shaped, electrically conductive contact pad 44 into contact with the terminals 62, 64, as shown in FIG. 4b. The terminals 62, 64 act like a closed switch, wherein the terminals 62, 64 are electrically connected. FIG. 4c shows that the terminals 62, 64 can also be electrically connected when the second key 22 is pressed toward the circuit board 50 along a direction denoted by an arrow 94 from its original position, shown in phantom. As shown in FIG. 4c, as the second key 22 is pressed along the direction 94, the base support 32 distorts the flexible circuit board 50. The distorted circuit board 50, in turn, pushes the activation mat 40 towards the first keymat 10, depressing the dome-shaped, contact pad 44 into contact with the terminals 62, 64.

Figure 4D:
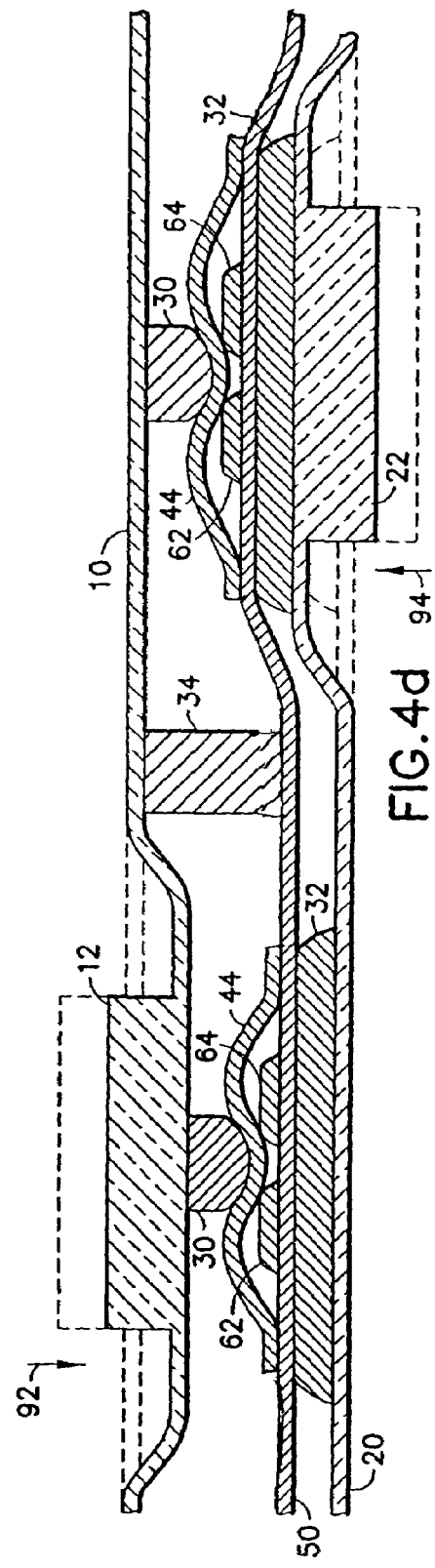
FIG. 4d is a cross-sectional view illustrating the activation of the circuit board by pressing a key on either side of the keyboard, wherein the keys on different sides use different activation devices.

FIG. 4d illustrates the activation of the circuit board 50 by pressing either a first key 12 on the first keymat 10 or a second key 22 on the second keymat 20, wherein the keys 12, 22 use different contact pads 44.

In order to physically isolate the action of one dome-shaped contact pad 44 from another, it is possible to provide a plurality of spacers 34, as shown in FIGS. 4a–4d.

Figure 5:
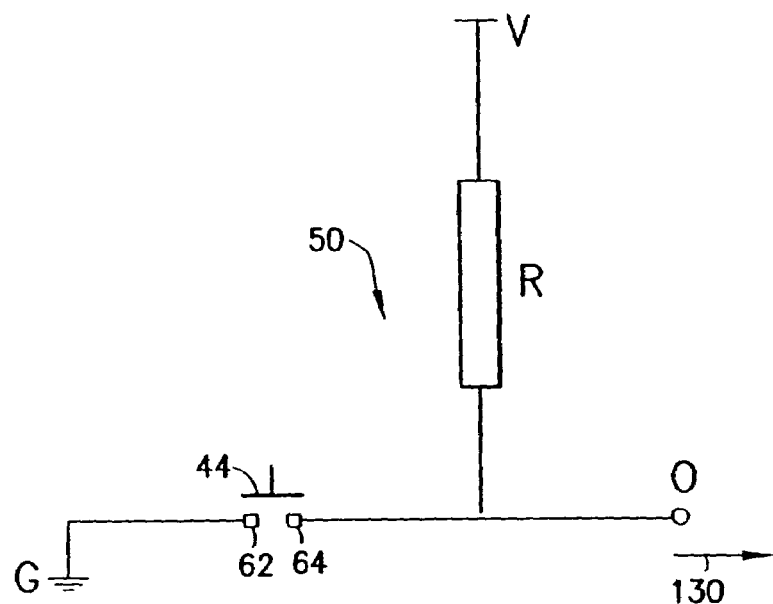
FIG. 5 is a schematic diagram illustrating the principle of activating the circuit board.

FIG. 5 is a schematic diagram illustrating the principle of activating the circuit board 50 involving the terminals 62, 64. As shown, the terminals 62, 64 act like a switch, which can be closed with the electrically conductive contact 44. For example, the terminal 62 is connected to the electrical ground G and the terminal 64 is connected to an output terminal O, which is connected to a voltage source having a voltage level V through a resistor R. When the terminals 62, 64 are not shorted by the contact 44, the voltage at the output terminal O is equal to or slightly lower than V. However, when the terminals 62, 64 are electrically connected to each other by the contact 44, the output terminal O is electrically grounded. Thus, when the contact 44 is caused to make contact with the terminals 62, 64, it provides a signal 130 indicative of the voltage change at the output terminal O.

Figure 6A:
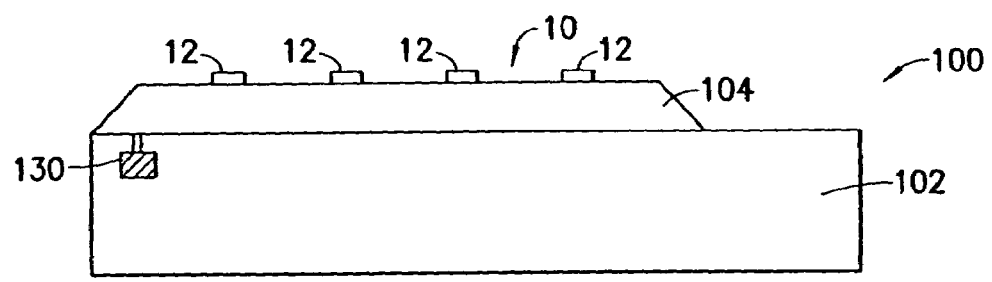
FIG. 6a is a diagrammatic representation of an electronic device having a switching mechanism to define a keyboard mode when the cover is closed.

It should be noted that the connector arrangement on the circuit board 50, as shown in FIGS. 3a–3c and 4a–4d, is shared by both the first keymat 10 and the second keymat 20, but it is preferred that the key functions of the keymat 10 and the keymat 20 are not the same. Because the same activation mat 40, or the like, can be pressed on either side thereof, the electronic circuitry in the electronic device that uses the keyboard 1 should be able to recognize which one of the keymats 10, 12 is being used. As shown in FIG. 6a, it is possible to install in the electronic device 100 a contact switch 130 which is operatively connected to the cover 104 and the device body 102. The switch 130 is operable at two different states (open and closed, for example) such that when the cover 104 is closed, as shown in FIGS. 1a and 6a, the keyboard 1 (FIGS. 3a–4d) functions in accordance with the input from the first keys 12 of the first keymat 10. However, when the cover 104 is open, as shown in FIGS. 1b and 6b, the keyboard 1 functions in accordance with the input from second keys 22 of the second keymat 20. It is well-known that a mobile phone that has a phone cover uses an active flip or the like to connect and disconnect a phone call. A similar device can be used for the switch 130.

It is also possible to install on the cover 104 a device 132 similar to a tilt switch or a gravity-sensitive switch, as shown in FIGS. 6b and 6c, which can sense the direction of the cover 104 regarding the gravity. With such a switch, the keyboard 1 can function differently when the first keymat 10 is facing upward as opposed to when the second keymat 20 is facing upward. It is possible to choose the active side by user selection.

If different detection areas are used for the first side and the second side, the pressed side and the key are clearly defined.

In FIGS. 1a, 1b, 6a–6c, the double-sided keyboard 1 or 1' is implemented on a cover of an electronic device. It is possible that the double-sided keyboard 1 or 1' is a non-movable part of an electronic device 120 or 122, as shown in FIGS. 7a and 7b. As shown in FIG. 7a, the double-sided keyboard is an extended portion 105 of the device body 102 of the electronic device 120, which includes a display 106. As shown in FIG. 7b, the double-sided keyboard is an extended portion 105 of the device body 103 of the electronic device 122, which has two displays 106 and 107 corresponding to the keymats 10 and 12.

It should be noted that, as shown in FIGS. 4a–5, the dome-shaped contact pad 44 is electrically conductive so that when the contact pad 44 makes contact with the terminals 62, 64, it electrically connects the terminals. However, it is not necessary for the contact pad 44 to be electrically conductive and for it to physically make contact with the terminals 62, 64 in order to activate the circuit board 50. For example, the contact pad 44 can be a poor electrical conductor, but it can cause a change in the capacitance between the terminals 62, 64 when it is in close proximity to the terminals 62, 64. This capacitance change can, in turn, cause a frequency change in a signal or other electrical characteristics of the signal in the circuit board 50. The activation mat 40 can be made of a variety of materials. For example, it can be made of a non-conductive material and then made conductive by a flexible metal coating; it can be made from an inherently conductive polymer membrane such as polyacetylene, or it can be made of a polymer matrix embedded with a conductive filler, such as carbon or other metallic particles. It is also possible that only the underside of the dome-shaped contact pad 44 is made conductive by having a flexible, conductive epoxy adhesive provided thereon, while the rest of the activation mat 40 is electrically non-conductive. Furthermore, the resistor R in FIG. 5 can be the same in all keys 12, 22, but it can be different in different keys.

Figure 8A:
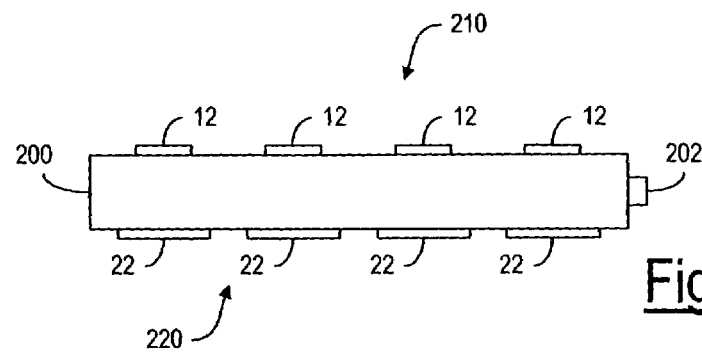
FIG. 8a is a diagrammatic representation showing a removable keyboard having two different user interfaces, according to the present invention.
Figure 8B:
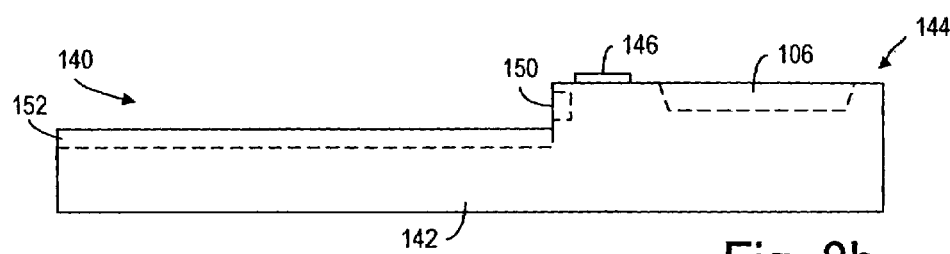
FIG. 8b is a diagrammatic representation showing an electronic device having a device body for placing a removable keyboard, according to the present invention.
Figure 8C:
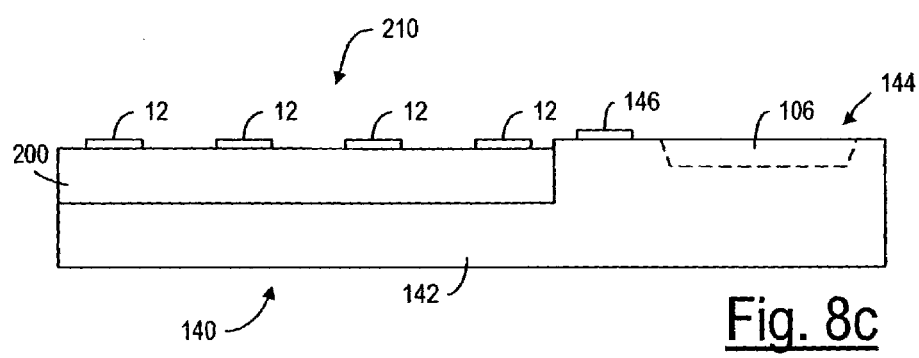
FIG. 8c is a diagrammatic representation showing the electronic device having thereon the double-sided keyboard, according to the present invention.
Figure 8D:
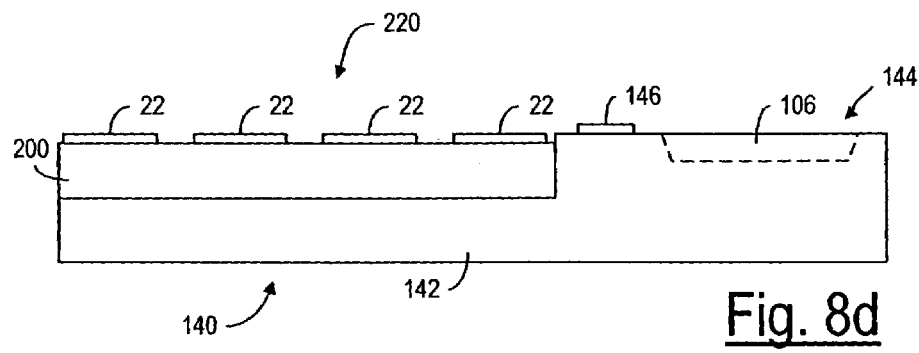
FIG. 8d is a diagrammatic representation showing the electronic device of FIG. 8c, wherein a different user interface is used for entering information.

The double-sided keyboard, according to the present invention, can be detached from the electronic device. As shown in FIG. 8a, the double-side keyboard 200 has thereon two different user interfaces. The first user interface 210 includes a set of first keys 12 and the second user interface 220 includes a set of second keys 22, so that when the keyboard 200 is attached to an electronic device 140, as shown in FIGS. 8c–8d, it turns the electronic device 140 into two different devices with different functions. The keyboard 200 also has a connector 202, which is engaged with a connector 150 on the electronic device 140, as shown in FIG. 8b, for conveying signals indicative of information entered by a user using the keys 12 or 22. As shown in FIG. 8b, the electronic device 140 has a device body 142, which has mounting grooves 152 to secure the keyboard 200 when the keyboard is attached to the device body 140. The device body 142 has an upper side 144 facing the user when the user enters information in the electronic device 140. When the keyboard 200 is attached to the device body 142, either the first user interface 210 is exposed on the upper side 144 of the device body 142, as shown in FIG. 8c, or the second user interface 220 is exposed on the upper side 144, as shown in FIG. 8d. It is possible that the electronic device 140 has a display 106 to show information to the user, and a set of common keys 146, which can be used for entering information or for controlling the electronic device 140 regardless of which user interface 210, 220 is exposed.

Figures 9A, 9B:
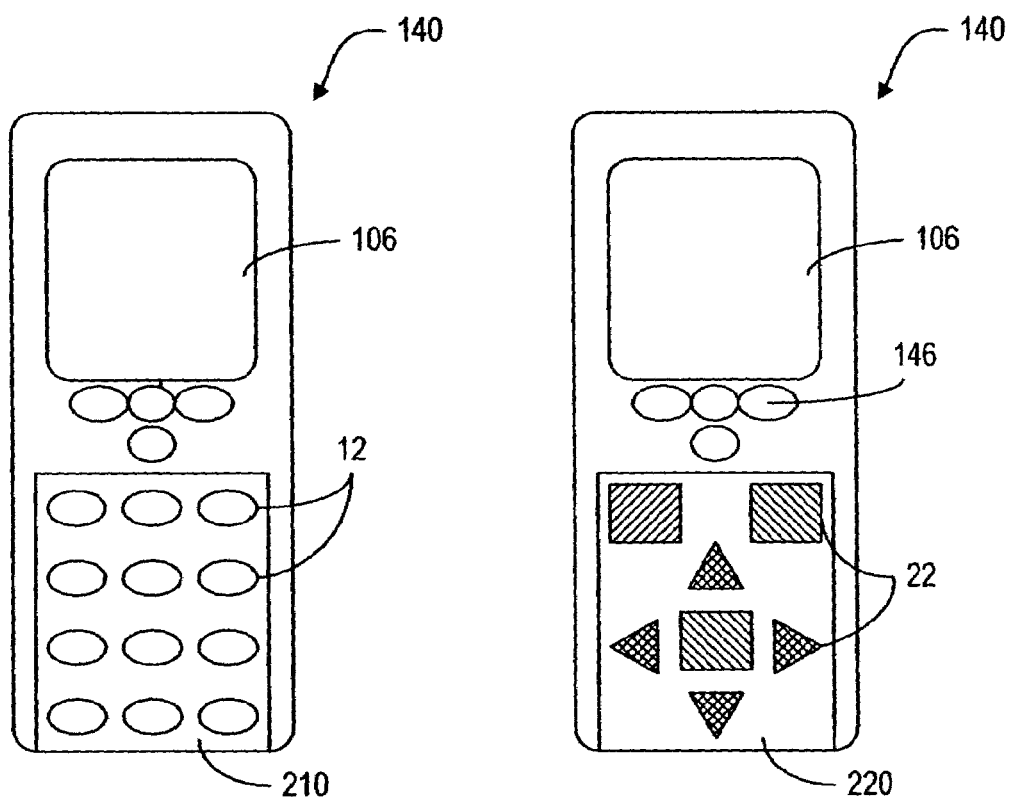
FIG. 9a is a top view showing an electronic device having an exemplary user interface.
FIG. 9b is a top view showing the electronic device of FIG. 9a with a different user interface.
Figure 10A:
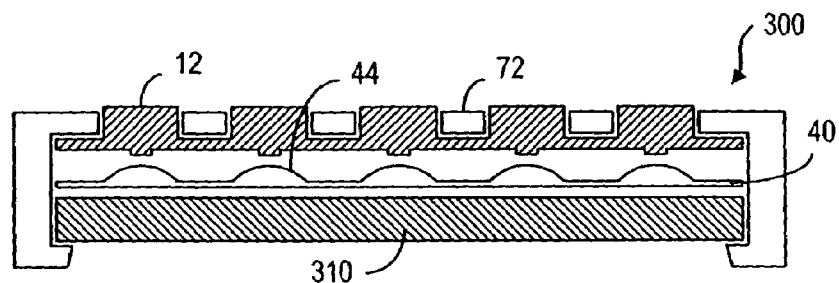
FIG. 10a is a cross-sectional view showing yet another double-sided keyboard, according to the present invention.
Figure 10B:
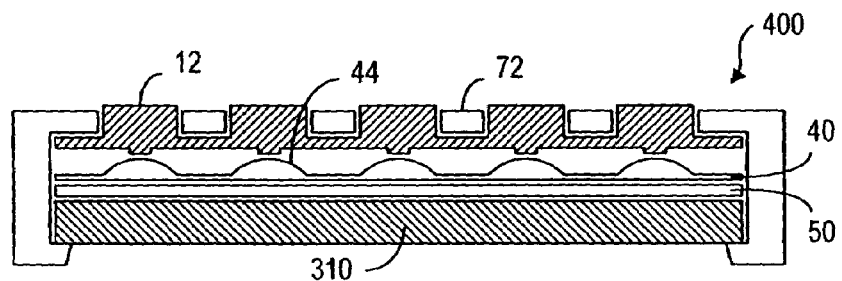
FIG. 10b is a cross-sectional view showing still another double-sided keyboard, according to the present invention.
Figure 10C:
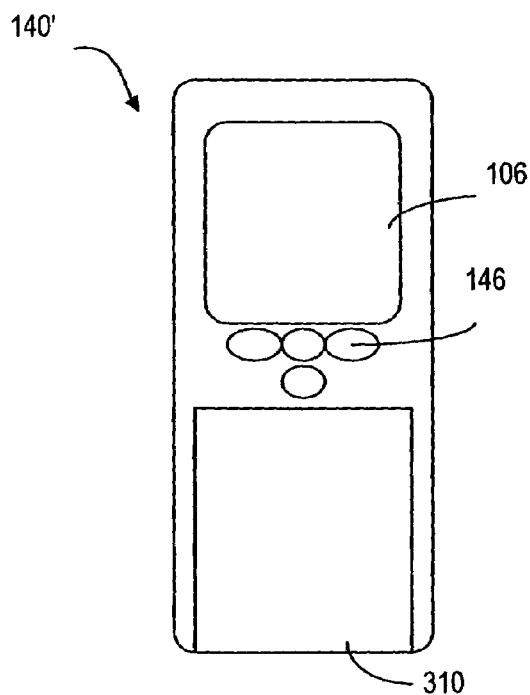
FIG. 10c is top view showing the electronic device of FIG. 9a with yet another user interface.

FIGS. 9a shows an exemplary layout of the user interface 210, which can be used as a phone keypad. FIG. 9b shows an exemplary layout of the user interface 220, which can be used as a keypad for playing electronic games on the electronic device 140. Not only can the user change the keypad of a particular keyboard by switching the sides of the keyboard, the user can user another keyboard on the same electronic device 140 as well. Thus, the double-sided keyboard 200 is used as an insert or an accessory to the device body 142 to change the functions of the electronic device 140. For example, the user can insert another double-sided keyboard 300, as shown in FIGS. 10a and 10b, onto the same device body 142. As shown in FIGS. 10a and 10b, the double-sided keyboard 300 has a plurality of keys 12 on one side and a touch pad 310 on the other side. When the keyboard 300 is inserted onto the device body 142 with the touch pad 310 exposed to the user, as shown in FIG. 10c, the user can make drawings or control the electronic device 140'.

The double-sided keyboard 300 comprises a dome-sheet or activation mat 40 and a circuit board 50 between the keys 12 and the touch pad 310, as shown in FIG. 10a. The touch pad 310 can be made of an EMFI film (electromechanical film), for example, to allow the user to enter information in the electronic device 140'. As it is known, an electromechanical film is a biaxially oriented plastic film containing a permanent electrical charge. When the film is deflected by touching, it produces an electrical signal. Thus, with electrodes disposed on the film surfaces to convey electrical signals to a connector, the electromechanical film can be used as a touch sensor. As with the keyboard 200, as shown in FIGS. 3a–4c, the user can press one or more keys 12 to cause the corresponding electrically conductive sections 44 to make electrical contact with the circuit board 50 in order to enter information in the electronic device 140'. The user can also enter information in the electronic device 140' by using a finger, a pen or a stylus to assert pressure on different locations on the touch pad 310. It is understood that the electrodes (not shown) on the touch pad are connected to a connector 202 (FIGS. 8a) for providing touch pad signals to the device body 142 (FIG. 8b).

Alternatively, the dome-sheet 40 is not actually for making electrical contact with a circuit board in the double-sided keyboard. As shown in FIG. 10b, the dome sheet 40' can be made of an electrically non-conductive material just to give a tactile feel when the user presses the keys 12. The actual sensing of the pressing of the keys 12 is carried out by the touch pad 310. The touch pad 310 in FIG. 10b detects the pressure on either side of the touch pad: the pressure on one side is asserted directly by a finger or a pen as with the touch pad in FIG. 10a, whereas the pressure on the other side is asserted by the pressing of the keys 12.

It is also possible to replace the circuit board 50, as shown in FIGS. 3a–4c, with a touch pad 310. Furthermore, the connector 202 of the keyboard 200 and the connector 150 on the device body 142 (FIGS. 8a and 8b) can be a serial interface with a small number of pins symmetrically arranged so that the keyboard 200 can fit both ways to the device body 142. A processor (not shown) in the device body 142 can recognize whether the first user interface 210 or the second user interface 220 is exposed for information entering. It is also possible to use a resistive strip on the keyboard 200 and a number of pins on the device body 142 to input data from the keyboard 200 to the device body 142. The present invention uses active domes 44 (electrically conducting) or passive domes (electrically non-conducting) to facilitate information entering using a double-sided keyboard 200, 300. The conveying of entered information from a removable keyboard 300 to a device body 142 can be carried out by connectors, resistive strips or any other means. No particular method of conveying information is preferred.

Thus, although the invention has been described with respect to a preferred embodiment thereof, it will be understood by those skilled in the art that the foregoing and various other changes, omissions and deviations in the form and detail thereof may be made without departing from the spirit and scope of this invention.

What is claimed is:

1. A double-sided keyboard for entering information in an electronic device, the electronic device having a device connector, said keyboard comprising:
   a circuit board having a first side and an opposing second side;
   a first plurality of keys adjacent to the first side;
   a second plurality of keys adjacent to the second side; and
   a plurality of electrically conductive members disposed on the first side of the circuit board so that when at least one of the keys is pressed, at least one electrically conductive member is operatively connected to the circuit board for providing a signal indicative of the information for use in the electronic device, wherein the circuit board is electrically connected to a circuit connector, which can be attached to the device connector for electrically connecting the circuit board to the device connector for conveying the signal from the keyboard to the device body, and wherein the circuit connector can be attached to the device connector
   in a first attaching position to allow a user to access the first plurality of keys and
   in a second attaching position to allow a user to access the second plurality of keys, wherein the electrically conductive members comprise a plurality of dome-shaped segments for making electrical contact with the circuit board to activate the circuit board for providing the signals, and wherein the dome-shaped segments are shared with the first and second plurality of keys such that each dome-shaped segment can be caused to make electrical contact with the circuit board by either one of the first plurality of keys or one of the second plurality of keys.

2. The keyboard of claim 1, wherein the electrically conductive members comprise:
   a first plurality of dome-shaped segments for making electrical contact with the circuit board to activate the circuit board by pressing one of the first plurality of keys; and
   a second plurality of dome-shaped segments for making electrical contact with the circuit board to activate the circuit board by pressing one of the second plurality of keys.

3. The keyboard of claim 1, wherein the electrically conductive members are fixedly attached to the circuit board.

4. The keyboard of claim 1, further comprising a mat disposed between the first plurality of keys and the circuit board, wherein the electrically conductive members are attached to the mat.

5. The keyboard of claim 1, further comprising a mat disposed between the first plurality of keys and the circuit board, wherein the electrically conductive members are integrated with the mat.

6. The keyboard of claim 1, wherein the keyboard further comprises a first keymat for disposing the first plurality of keys.

7. The keyboard of claim 6, wherein the keyboard further comprises a second keymat for disposing the second plurality of keys.

8. The keyboard of claim 7, wherein the circuit board is integrated into the second keymat.

9. The keyboard of claim 7, further comprising a mat cover adjacent to the first keymat away from the first side of the circuit board for separating the first plurality of keys.

10. The keyboard of claim 7, further comprising a mat cover adjacent to the second keymat away from the second side of the circuit board for separating the second plurality of keys.

11. The keyboard of claim 1, wherein the circuit connector can be detached from the device connector so as to allow the user to change the attaching position.

12. An electronic device including a device body having a body direction facing a user to allow the user to enter information in the electronic device, the electronic device comprising:
a device connector disposed on the device body; and
a double-sided keyboard for entering the information, the keyboard having a first side and an opposing second side, the keyboard comprising:
a circuit connector removably attached to the device connector
a circuit electrically connected to the circuit connector;
a first user interface having a plurality of keys disposed on the first side of the keyboard;
a plurality of dome-shaped segments disposed between the keys and the circuit, wherein when at least one of the keys is pressed, at least one of the dome-shaped segments is deformed, causing the first user interface to interact with the circuit for providing signal indicative of the information;
a second user interface disposed on the second side of the keyboard and capable of interacting with the circuit for providing further signal indicative of the information, wherein the circuit connector can be attached to the device connector for conveying the signals from the circuit to the device body either
in a first connecting position such that the first side is oriented in a direction substantially the same as the device direction so as to allow the user to enter the information via the first user interface, or
in a second connecting position such that the second side is oriented in a direction substantially the same as the device orientation so as to allow the user to enter the information via the second user interface.

13. The electronic device of claim 12, wherein the second user interface comprises a plurality of further keys, and wherein the further keys cause the circuit to make contact with the dome-shaped segments for providing the signals when at least one of the further keys is pressed.

14. The electronic device of claim 12, wherein the dome-shaped segments are electrically conductive for causing the circuit to provide the signals when the deformed dome-shaped segment is electrically contacting the circuit.

15. The electronic device of claim 12, wherein the second user interface comprises a touch surface, which causes the circuit to provide the signals when the touch surface is touched.

16. The electronic device of claim 12, wherein the second user interface comprises a touch surface, which causes the circuit to provide the signals when pressure is asserted at a location of the touch surface.

17. The electronic device of claim 16, wherein when at least one of the keys is pressed, the pressed key asserts the pressure to the touch surface through the deformed dome-shaped segment.

18. A double-sided keyboard for use in an electronic device to allow a user to enter information in the electronic device, the electronic device having a device connector, the keyboard comprising:
a first side and an opposing second side;
a circuit connector
a circuit electrically connected to the circuit connector;
a first user interface having a plurality of keys disposed on the first side of the keyboard;
a plurality of dome-shaped segments disposed between the keys and the circuit, wherein when at least one of the keys is pressed, at least one of the dome-shaped segments is deformed, causing the first user interface to interact with the circuit for providing signal indicative of the information; and
a second user interface disposed on the second side of the keyboard and capable of interacting with the circuit for providing further signal indicative of the information, wherein the circuit connector is electrically connected to the device connector for conveying the signals from the keyboard to the device body when the keyboard is attached to the device body, and wherein the circuit connector can be electrically connected to the device connector either in a first position to allow a user to access the first user interface, or in a second position to allow a user to access the second user interface.

19. The removable keyboard of claim 18, wherein the second user interface comprises a plurality of further keys, and wherein the further keys cause the circuit to make contact with the dome-shaped segments for providing the signals when at least one of the further keys is pressed.

20. The removable keyboard of claim 18, wherein the dome-shaped segments are electrically conductive for causing the circuit to provide the signals when the deformed dome-shaped segment is electrically contacting the circuit.

21. The removable keyboard of claim 18 wherein the second user interface comprises a touch surface, which causes the circuit to provide the signals when the touch surface is touched.

22. The removable keyboard of claim 18, wherein the second user interface comprises a touch surface, which causes the circuit to provide the signals when pressure is asserted at a location of the touch surface.

23. The removable keyboard of claim 22, wherein when at least one of the keys is pressed, the pressed key asserts the pressure to the touch surface trough the deformed dome-shaped segment.

* * * * *

UNITED STATES PATENT AND TRADEMARK OFFICE
CERTIFICATE OF CORRECTION

| | |
|---|---|
| PATENT NO. | : 7,176,894 B2 |
| APPLICATION NO. | : 10/634471 |
| DATED | : February 13, 2007 |
| INVENTOR(S) | : T. Östergård et al. |

It is certified that error appears in the above-identified patent and that said Letters Patent is hereby corrected as shown below:

In column 10, line 39, which is claim 1, line 18, "devicc" should be --device--.

In column 11, line 36, which is claim 12, line 10, "connector" should be --connector;--.

Signed and Sealed this

Twenty-ninth Day of May, 2007

JON W. DUDAS
*Director of the United States Patent and Trademark Office*